(12) United States Patent
Hamada et al.

(10) Patent No.: US 7,340,061 B1
(45) Date of Patent: Mar. 4, 2008

(54) INFORMATION PROCESSING APPARATUS, INFORMATION PROCESSING METHOD AND PROVIDING MEDIUM

(75) Inventors: Ichiro Hamada, Kanagawa (JP); Asako Fujii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/568,912

(22) Filed: May 11, 2000

(30) Foreign Application Priority Data

May 18, 1999 (JP) .............................. P11-136695

(51) Int. Cl.
*H04L 9/00* (2006.01)
*H04L 9/20* (2006.01)
*H04L 9/30* (2006.01)
*H04L 9/08* (2006.01)

(52) U.S. Cl. .................. 380/278; 380/277; 713/168; 713/171; 726/26

(58) Field of Classification Search .............. 380/278, 380/277; 713/150
See application file for complete search history.

(56) References Cited

U.S. PATENT DOCUMENTS

| | | | | |
|---|---|---|---|---|
| 5,319,705 A | * | 6/1994 | Halter et al. | 705/54 |
| 5,708,711 A | * | 1/1998 | Rosauer et al. | 380/273 |
| 5,937,066 A | * | 8/1999 | Gennaro et al. | 380/286 |
| 6,058,476 A | * | 5/2000 | Matsuzaki et al. | 713/169 |
| 6,073,234 A | * | 6/2000 | Kigo et al. | 713/161 |
| 6,076,077 A | * | 6/2000 | Saito | 705/51 |
| 6,097,818 A | * | 8/2000 | Saito | 380/278 |
| 6,141,753 A | * | 10/2000 | Zhao et al. | 713/176 |
| 6,263,313 B1 | * | 7/2001 | Milsted et al. | 705/1 |
| 6,289,455 B1 | * | 9/2001 | Kocher et al. | 713/194 |
| 6,550,011 B1 | * | 4/2003 | Sims, III | 713/193 |
| 6,571,337 B1 | * | 5/2003 | Xiao | 713/194 |
| 7,219,227 B2 | * | 5/2007 | Hori et al. | 713/158 |

FOREIGN PATENT DOCUMENTS

| | | |
|---|---|---|
| EP | 0 800 312 | 10/1997 |
| EP | 0 858 183 A2 | 8/1998 |
| EP | 0 874 300 | 10/1998 |

OTHER PUBLICATIONS

"5c Digital Transmission Content Protection White Paper", Jul. 14, 1998, pp. 1-13, XP002907865.

* cited by examiner

*Primary Examiner*—Syed A. Zia
(74) *Attorney, Agent, or Firm*—Oblon, Spivak, McClelland, Maier & Neustadt, P.C.

(57) ABSTRACT

In an information processing apparatus, a key management unit forms a judgment as to whether an authentication key owned by an application program is valid or invalid. A content protection unit is controlled based on this determination so that contents are exchanged between the information processing apparatus and the application program. An encryption/decryption unit encrypts a decrypted content by using an encryption key received from a key management unit and outputs the encrypted content to an encrypted-information addition unit. The encrypted-information addition unit adds encrypted information to the encrypted content received from the encryption/decryption unit and outputs the encrypted content with the encrypted information added thereto to the application program. As a result, it is possible to prevent content from being utilized illegally.

11 Claims, 6 Drawing Sheets

FIG. 2

INFORMATION PROCESSING APPARATUS, INFORMATION PROCESSING METHOD AND PROVIDING MEDIUM

BACKGROUND OF THE INVENTION

1. Field of the Invention

The present invention relates to an information processing apparatus, an information processing method and a providing medium. More particularly, the present invention relates to an information processing apparatus, an information processing method and a providing medium which are suitable for applications in which unauthorized use of a content must be avoided.

2. Description of the Related Art

As a conventional technique to prevent a content with a protected copyright from being illegally copied, a SCMS (Serial Copy Management System) or a CGMS (Copy Generation Management System) are adopted in an apparatus capable of recording such a content. Examples of the content are audio data recorded on a CD (Compact Disc) and AV data recorded on a DVD (Digital Versatile Disc). Such a content can be recorded typically by an MD (Mini Disc) recorder, a CD-R recorder or a DV (Digital Video) recorder. In the SCMS and the CGMS, predetermined information is added to a content to limit the number of allowable copies.

In recent years, it is possible to exchange a content between an AV apparatus for playing back or recording a content and a personal computer through an IEEE1394 bus. With the personal computer employing a CPU having an increased processing power and a hard disc having an increased storage capacity, the personal computer is capable of playing back, recording and editing a content.

Thus, if an illegal application program for intentionally falsifying the aforementioned information added to a content is installed in a personal computer, there will be raised a problem of an inability to prevent the content from being copied by the personal computer illegally.

SUMMARY OF THE INVENTION

It is an object of the present invention addressing the problems described above to provide an information processing apparatus, an information processing method and a providing medium which are capable of preventing a content from being used illegally by using an illegal application program installed in a personal computer by encrypting the content before supplying the content to the application program.

An information processing apparatus provided by the present invention includes an encryption-key generation means for generating an encryption key by using a source key corresponding to copyright information added to an input content, an encryption means for encrypting the content by using the encryption key, a judgment means for forming a judgment on validity of an application program by using an authentication key received from the application program, a secret-key generation means for generating a secret key by using the authentication key received from the application program, and a supply means for supplying an encryption key encrypted by using the secret key generated by the secret-key generation means and the content encrypted by the encryption means to the application program in dependence on a result of the judgment formed by the judgment means.

An information processing method provided by the present invention includes an encryption-key generation step of generating an encryption key by using a source key corresponding to copyright information added to an input content, an encryption step of encrypting the content by using the encryption key, a judgment step of forming a judgment on validity of an application program by using an authentication key received from the application program, a secret-key generation step of generating a secret key by using the authentication key received from the application program, and a supply step of supplying the encryption key encrypted by using the secret key generated at the secret-key generation step and the content encrypted at the encryption step to the application program in dependence on a result of the judgment formed at the judgment step.

A providing medium is used for providing a program to be read out by a computer for driving an information processing apparatus to carry out processing including an encryption-key generation step of generating an encryption key by using a source key corresponding to copyright information added to an input content, an encryption step of encrypting the content by using the encryption key, a judgment step of forming a judgment on validity of an application program by using an authentication key received from the application program, a secret-key generation step of generating a secret key by using the authentication key received from the application program, and a supply step of supplying the encryption key encrypted by using the secret key generated at the secret-key generation step and the content encrypted at the encryption step to the application program in dependence on a result of the judgment formed at the judgment step.

In the information processing apparatus, the information processing method and the providing medium which are provided by the present invention, an encryption key is generated by using a source key corresponding to copy right information added to an input content, and the content is encrypted by using the encryption key. In addition, a secret key is generated by using an authentication key received from an application program and a judgment on validity of the application program is formed. An encryption key encrypted by using the secret key and the content encrypted by using the encryption key are supplied to the application program in dependence on a result of the judgment.

As described above, according to the information processing apparatus, the information processing method and the providing medium which are provided by the present invention, a judgment on validity of an application program is formed on the basis of an authentication key, and an encryption key encrypted by using a secret key and a content encrypted by using the encryption key are supplied to the application program in dependence on a result of the judgment. It is thus possible to prevent a content from being used illegally.

DETAILED DESCRIPTION OF THE PREFERRED EMBODIMENT

Figure 1:
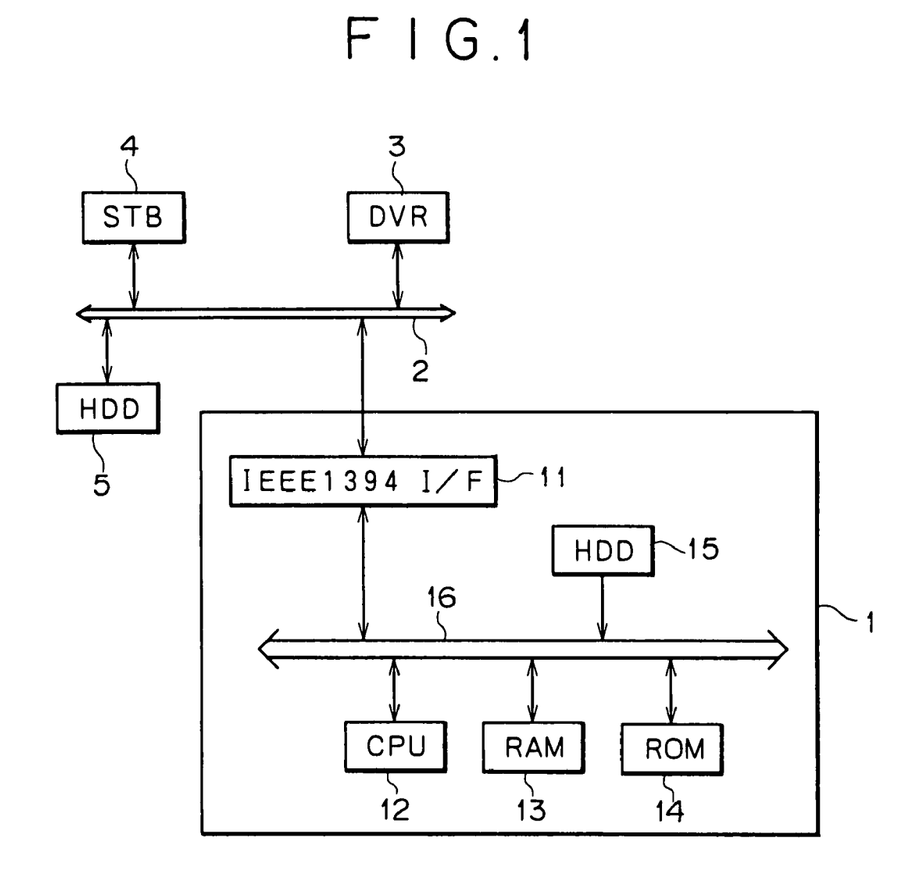
FIG. 1 is a block diagram showing a typical configuration of a personal computer to which the present invention is applied.

A typical configuration of a personal computer (PC) 1 to which the present invention is applied is explained by referring to FIG. 1. As shown in the figure, the personal computer 1 is connected to apparatuses capable of handing contents by an IEEE1394 bus 2. Examples of such apparatuses are a DV recorder (DVR) 3, a set top box (STB) 4 and a hard disc (HDD) 5.

It should be noted that a content communicated through the IEEE1394 bus 2 is encrypted in accordance with a DTLA method licensed by the DTLA (Digital Transmission Licensing Administrator), a licensing company, as recommended by a CPTWG (Copy Protection Technical Work Group).

The personal computer 1 comprises a IEEE1394 interface 11, a CPU 12, a RAM 13, a ROM 14 and a hard disc 15 which are connected to each other by a bus 16. The IEEE1394 interface 11 supplies a content received from another apparatus such as the DVR 3 through the IEEE1394 bus 2 to an application program activated in the personal computer 1. The application program is capable of carrying out processing such as operations to play back, record and edit a content. An application program capable of carrying out processing such as operations to play back, record and edit a content is referred to hereafter simply as an application. In addition, the IEEE1394 interface 11 also outputs a content processed by the application to another apparatus through the IEEE1394 bus 2.

It should be noted that an application program is stored in the hard disc 15, loaded into the RAM 13 under control of the CPU 12 based on a BIOS stored in the ROM 14 and then activated. A person in charge of an encryption system such as the DTLA supplies an intrinsic authentication key Kn to the application program. In order to obtain this authentication key, the user needs to make a contract or the like with the producer of the application program. Such a contract is made for preventing a content with a protected copyright from being used illegally.

The technical term "system" used in this specification implies a complete total apparatus including a plurality of apparatuses and means.

Figure 3:
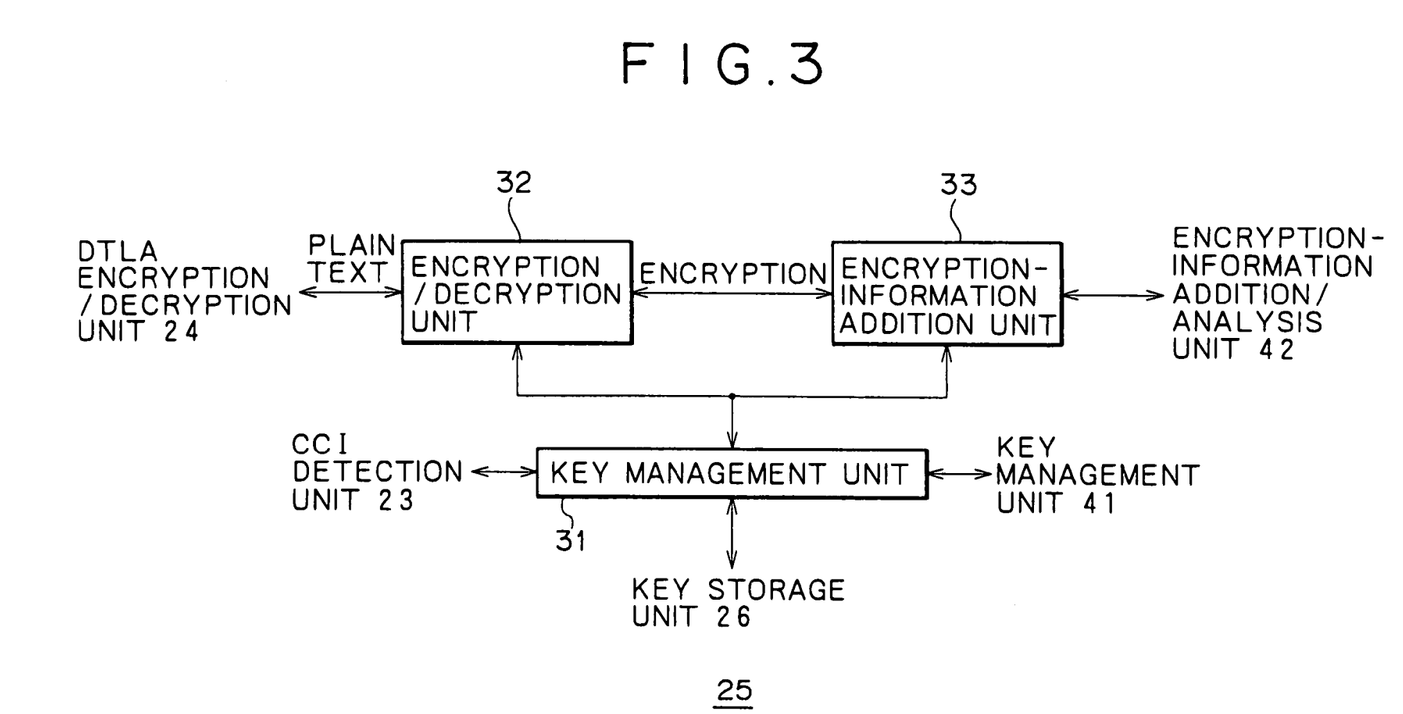
FIG. 3 is a block diagram showing a typical configuration of a content protection unit employed in the IEEE1394 interface shown in FIG. 2.

The authentication key Kn includes a pair of values, namely, an ID and a signature. A result obtained from the application of a predetermined processing formula to one of the 2 values is the other value. By applying the predetermined processing formula to both the ID and the signature, it is possible to verify whether or not they are a correct pair. The only component knowing this predetermined processing formula, that is, the only component capable of forming a judgment on validity of the authentication key Kn is a key management unit 31. In addition, since it is extremely difficult to reversely find the predetermined processing formula from the ID and the signature, the authentication key Kn can not practically be forged.

Figure 2:
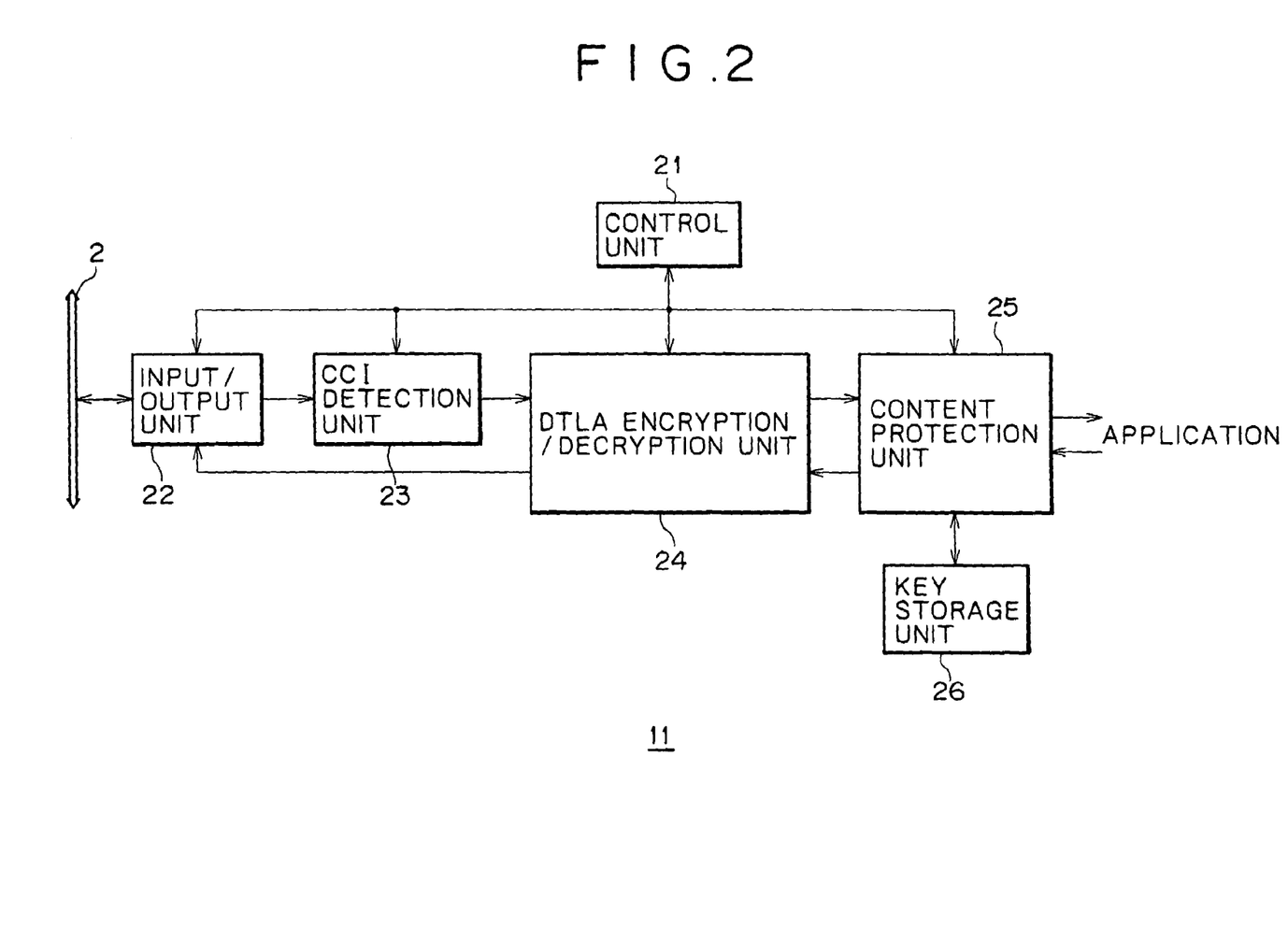
FIG. 2 is a block diagram showing a typical configuration of an IEEE1394 interface employed in the personal computer shown in FIG. 1.

FIG. 2 is a block diagram showing details of a typical configuration of an IEEE1394 interface 11. A control unit 21 controls the components employed in the IEEE1394 interface 11. An input/output unit 22 receives a content encrypted in accordance with the DTLA method from the IEEE1394 bus 2, passing on the content to a CCI (Copy Control Information) detection unit 23. The CCI detection unit 23 forwards the content received from the input/output unit 22 to a DTLA encryption/decryption unit 24. The CCI detection unit 23 detects a 2-bit CCI recorded in the header of the content, supplying the CCI to a control unit 21, the DTLA encryption/decryption unit 24 and a content protection unit 25.

It should be noted that the CCI is information on control of permitted operations to copy a content to which the CCI is added. The CCI can have one of 4 values, namely, 00, 10, 01 and 11. A CCI value of 00 represents "Copy Free" control which means that an unlimited number of operations to copy the content are permitted. A CCI value of 10 represents "One Generator Copy Possible" control which indicates that the content can be copied only once. A CCI value of 01 represents "No More Copy" control which indicates a second generation of a content. A second generation is a result of copying a content with a CCI value of 10. An operation to copy a second generation is not permitted. A CCI value of 11 represents "Never Copy" control which indicates that an operation to copy the content is not permitted.

The DTLA encryption/decryption unit 24 decrypts a content, which was encrypted in accordance with the DTLA method and is received from the CCI detection unit 23, and supplies the result of the decryption to the content protection unit 25. In addition, the DTLA encryption/decryption unit 24 encrypts a content received from the content protection unit 25 by adopting the DTLA method and supplies the result of the encryption to the input/output unit 22. It should be noted that the encryption and the decryption in the DTLA encryption/decryption unit 24 are carried out after mutual authentication work defined by the DTLA method between the DTLA encryption/decryption unit 24 and the DVR 3 serving as an apparatus generating a content has been completed.

The content protection unit 25 encrypts a content received from the DTLA encryption/decryption unit 24 and supplies the encrypted content to the application. In addition, the content protection unit 25 decrypts an encrypted content received from the application and supplies the decrypted content to the DTLA encryption/decryption unit 24. A key storage unit 26 is used for storing a plurality of source keys Ks for all CCI values. The source keys Ks are used in the encryption processing carried out by the content protection unit 25.

Figure 4:
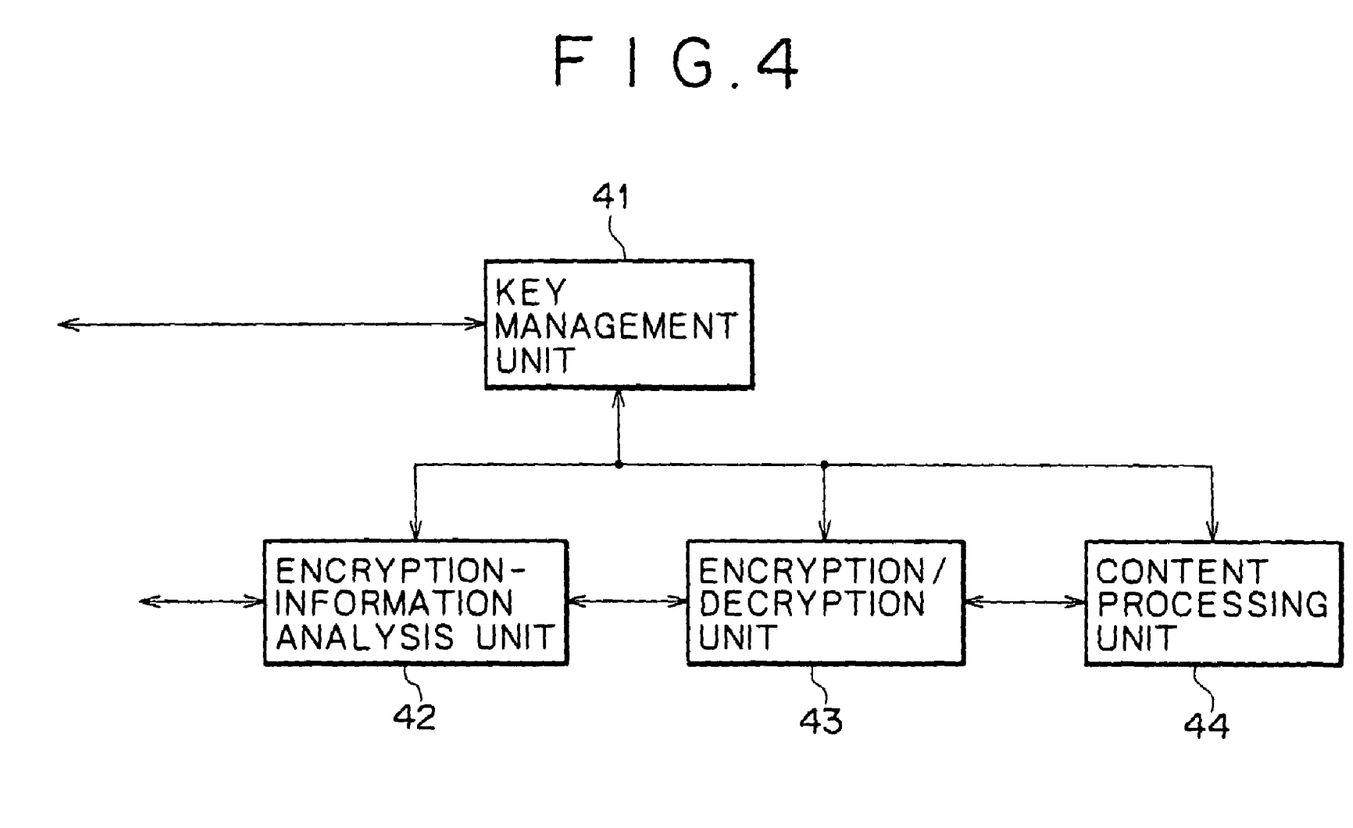
FIG. 4 is a block diagram showing a function of an application activated in the personal computer.

FIG. 3 is a block diagram showing details of a typical configuration of the content protection unit 25. A key management unit 31 forms a judgment as to whether or not an authentication key Kn received from a key management unit 41 of an application shown in FIG. 4 is valid. If the authentication key Kn is found valid, components employed in the content protection unit 25 are controlled so as to exchange contents with the application.

To put it in detail, the key management unit 31 applies a predetermined processing formula to an ID included in the authentication key Kn received from the application. Then, the key management unit 31 forms a judgment as to whether or not the result of applying the predetermined formula to the ID is equal to a signature included in the same authentication key Kn. If the result of applying the predetermined formula to the ID is found equal to the signature included in the same authentication key Kn, that is, if the authentication key Kn is found valid, the key management unit 31 further forms a judgment as to whether or not the ID and the signature form a valid key by applying a predetermined processing formula to the ID and the signature. If the key Kn comprising the ID and the signature is found valid, the key management unit 31 reads out a source key Ks corresponding to a CCI value supplied by the CCI detection unit 23 from the key storage unit 26. The key management unit 31 then generates an encryption key Kc by using the source key Ks and a random number, supplying the encryption key Kc to an encryption/decryption unit 32. It should be noted that the encryption key Kc is updated at intervals typically in range 30 to 120 seconds. The key management unit 31 outputs a CCI value to an encrypted-information addition unit 33 each time the encryption key Kc is updated. In addition, the key management unit 31 generates a secret key Ka based on information for computing a secret key Ka such as an authentication key and encrypts the encryption key Kc by using the secret key Ka. The encrypted secret key Ka is output to the key management unit 41 of the application. It should be noted that the information for computing the secret key Ka is received from the key management unit 41.

The encryption/decryption unit 32 encrypts a decrypted content received from the DTLA encryption/decryption unit 24 by using the encryption key Kc received from the key management unit 31 and outputs the encrypted content to the encrypted-information addition unit 33. The encryption/decryption unit 32 decrypts an encrypted content received from the encrypted-information addition unit 33 and outputs the decrypted content to the DTLA encryption/decryption unit 24.

The encrypted-information addition unit 33 adds a 2-bit CCI value and 1-bit encryption information to an encrypted content received from the encryption/decryption unit 32. The 1-bit encryption information is switched from "even" to "odd" each time the encryption key Kc is updated. The encrypted content with the 2-bit CCI value and the 1-bit encryption information added thereto is supplied to an encrypted-content analysis unit 42 of the application shown in FIG. 4. In addition, the encrypted-information addition unit 33 also outputs an encrypted content received from the encrypted-content analysis unit 42 to the encryption/decryption unit 32.

FIG. 4 is a functional block diagram showing an application capable of playing back, recording and editing a content. The key management unit 41 is used for storing an authentication key Kn assigned to an application program. The key management unit 41 also outputs the authentication key Kn along with information for computing the secret key Ka to the key management unit 31 employed in the content protection unit 25 before an exchange of contents with the application is started. In addition, the key management unit 41 decrypts the encryption key Kc encrypted by using the secret key Ka and received from the key management unit 31 in accordance with information showing whether or not the "odd" or "even" information has been switched, outputting the decrypted encryption key Kc to an encryption/decryption unit 43. The "odd" or "even" information which is received from the encryption-information analysis unit 42 shows updating status of the encryption key Kc included in the encryption information.

The encrypted-content analysis unit 42 outputs a content encrypted by using the encryption key Kc and received from the encrypted-information addition unit 33 to the encryption/decryption unit 43 and the encryption information added thereto to the key management unit 41. In addition, the encrypted-content analysis unit 42 also outputs an encrypted content received from the encryption/decryption unit 43 to the encrypted-information addition unit 33.

The encryption/decryption unit 43 decrypts a content encrypted by using the encryption key Kc and received from the encrypted-content analysis unit 42 by using the encryption key Kc received from the key management unit 41, outputting the decrypted content to a content processing unit 44. In addition, the encryption/decryption unit 43 encrypts a content received from the content processing unit 44 and outputs the encrypted content to the encrypted-content analysis unit 42.

The content processing unit 44 carries out processing such as a playback, recording or editing operation on a content supplied thereto in accordance with an operation carried out by the user. It should be noted that, since the content processing unit 44 receives a CCI value included in the encryption information analyzed by the encrypted-content analysis unit 42, the content processing unit 44 does not carry out processing violating the CCI value such as a copy operation that would exceed a maximum number of permitted copy operations.

It should be noted that, by implementing the IEEE1394 interface 11 in a single LSI (Large Scale Integrated Circuit), it is possible to avoid an illegal operation such as an operation to read out a decrypted content from a position in a circuit.

Figure 5:
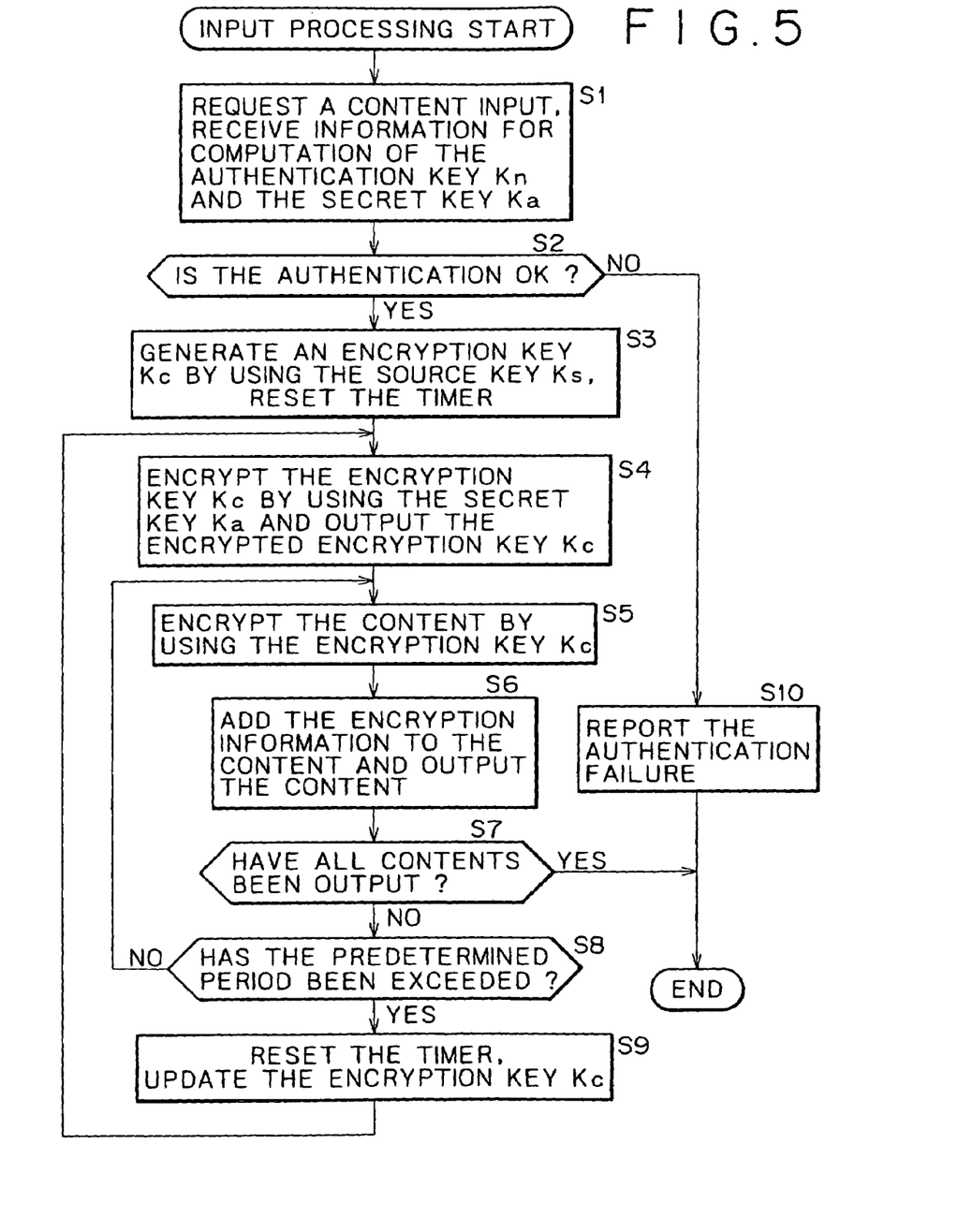
FIG. 5 shows a flowchart representing input processing of the IEEE1394 interface shown in FIG. 1.

Next, input processing to supply a content to an application is explained by referring to a flowchart shown in FIG. 5. Before this input processing is carried out, the content encrypted in accordance with the DTLA method is supplied to the IEEE1394 interface 11 and the CCI thereof is detected by the CCI detection unit 23 and supplied to the key management unit 31 employed in the content protection unit 25. The content encrypted in accordance with the DTLA method is decrypted by the DTLA encryption/decryption unit 24 and supplied to the encryption/decryption unit 32 employed in the content protection unit 25.

As shown in FIG. 5, the flowchart begins with a step S1 at which the key management unit 41 of the application makes a request for a content input, and outputs an authentication key Kn and information for computing a secret key Ka stored therein to the key management unit 31 employed in the content protection unit 25.

At the next step S2, the key management unit 31 forms a judgment as to whether or not the authentication key Kn received from the key management unit 41 is valid. If the outcome of the judgment indicates that the authentication key Kn is valid, the flow of the procedure goes on to a step S3.

At the step S3, the key management unit 31 reads out a source key Ks corresponding to the value of the CCI from the key storage unit 26 and then generates an encryption key Kc from the source Ks and a random number, outputting the encryption key Kc to the encryption/decryption unit 32. In addition, the key management unit 31 also resets a timer to 0. The timer is used for measuring a timing to update the encryption key Kc.

At the next step S4, the key management unit 31 generates a secret key Ka by using the information for computing the secret key Ka. Then, the key management unit 31 encrypts the encryption key Kc by using the secret key Ka and outputs the encrypted encryption key Kc to the key management unit 41 of the application. The key management unit 41 decrypts the encrypted encryption key Kc.

At the next step S5, the encryption/decryption unit 32 encrypts a decrypted content received from the DTLA encryption/decryption unit 24 by using the encryption key Kc received from the key management unit 31 and outputs the encrypted content to the encrypted-information addition unit 33.

At the next step S6, the encrypted-information addition unit 33 generates encryption information comprising a CCI value and information showing updating status of the encryption key Kc, adding the generated encryption information to an encrypted content received from the encryption/decryption unit 32. Since the encryption key Kc has not been updated in this case, the status information is even. The encrypted-information addition unit 33 then outputs the encrypted content with the encryption information added thereto to the encrypted-content analysis unit 42 of the application. The encrypted-content analysis unit 42 forms a judgment as to whether or not the information showing updating status of the encryption key Kc has been switched and outputs the outcome of the judgment to the key management unit 41. On the basis of the outcome of the judgment, the key management unit 41 supplies the current encryption key Kc to the encryption/decryption unit 43. The encryption/decryption unit 43 decrypts the content by using the encryption key Kc and outputs the decrypted content to the content processing unit 44.

At the next step S7, the key management unit 31 forms a judgment as to whether or not all contents have been output from the content protection unit 25 to the application. If the outcome of the judgment indicates that not all contents have been output from the content protection unit 25 to the application, the flow of the procedure goes on to a step S8. At the step S8, the key management unit 31 refers to its own timer to detect a time at which the present encryption key Kc is used. The key management unit 31 then forms a judgment as to whether or not the detected time has exceeded a predetermined period of typically 30 seconds to 120 seconds. If the outcome of the judgment indicates that the interval between the detected time and the most recent time to update the encryption key Kc has not exceeded the predetermined period, the flow of the procedure goes back to the step S5 to repeat the processing thereof and the subsequent pieces of processing.

If the outcome of the judgment formed at the step S8 indicates that the detected time has exceeded the predetermined period, on the other hand, the flow of the procedure goes on to a step S9. At the step S9, the key management unit 31 generates or updates the encryption key Kc by using the source key Ks and a regenerated random number, outputting the new encryption key Kc to the encryption/decryption unit 32. In addition, the key management unit 31 resets its own timer to 0.

Then, the flow of the procedure goes back to the step S4. The subsequent pieces of processing are repeated until the outcome of the judgment formed at the step S7 indicates that all contents have been output from the content protection unit 25 to the application. It should be noted, however, that the information indicating the updating status of the encryption key Kc is switched from "even" to "odd" since the encryption key Kc is updated at the step S9. As described above, the information indicating the updating status of the encryption key Kc is included in the encryption information added at the step S6. The encryption key Kc supplied from the key management unit 41 to the encryption/decryption unit 32 is also updated in accordance with the information indicating the updating status of the encryption key Kc.

If the outcome of the judgment formed at the step S2 indicates that the authentication key Kn is invalid, on the other hand, the flow of the procedure goes on to a step S10. At the step S10, the key management unit 31 informs the key management unit 41 of the fact that the authentication ends with no-go status.

Figure 6:
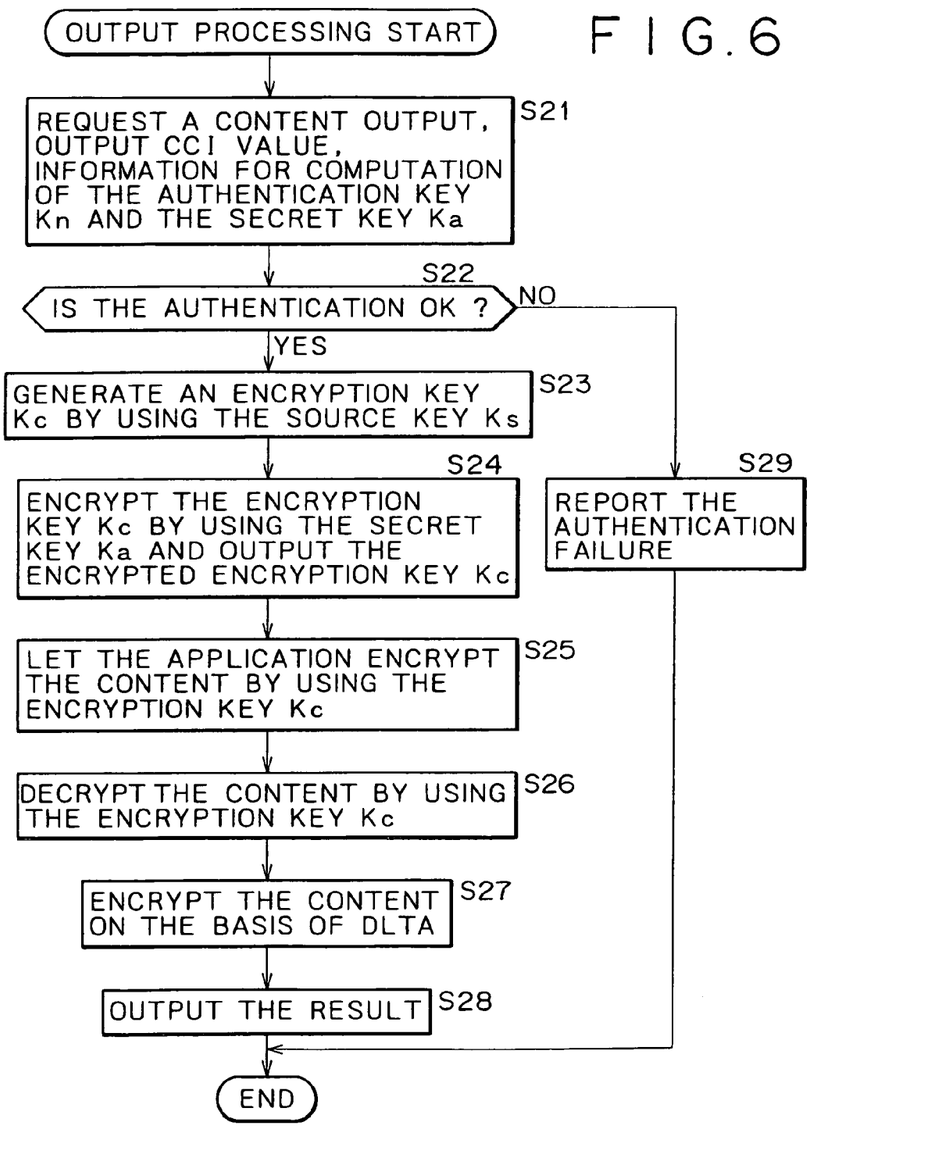
FIG. 6 shows a flowchart representing output processing of the IEEE1394 interface shown in FIG. 1.

The following description explains processing to output a content processed by an application to the IEEE1394 bus 2 by referring to a flowchart shown in FIG. 6. This output processing is carried out after the content edited by the content processing unit 44 of the application is supplied to the encryption/decryption unit 43.

As shown in the figure, the flowchart begins with a step S21 at which the key management unit 41 of the application makes a request for an operation to output a content to the IEEE1394 bus 2. The key management unit 41 also outputs a stored authentication key Kn, information for computing the secret key Ka and a CCI value set for the output content to the key management unit 31 employed in the content protection unit 25.

At the next step S22, the key management unit 31 forms a judgment as to whether the authentication key Kn received from the key management unit 41 is valid or invalid. If the outcome of the judgment indicates that the authentication key Kn is valid, the flow of the procedure goes on to a step S23.

At the step S23, the key management unit 31 reads out a source key Ks corresponding to the CCI value supplied by the key management unit 41 from the key storage unit 26 and then generates an encryption key Kc from the source key Ks and a random number, outputting the encryption key Kc to the encryption/decryption unit 32. At the next step S24, the key management unit 31 generates a secret key Ka by using the information for computing the secret key Ka from the key management unit 41. Then, the key management unit 31 encrypts the encryption key Kc generated at the step S22 by using the secret key Ka and outputs the encrypted encryption key Kc to the key management unit 41 of the application. The key management unit 41 decrypts the encrypted encryption key Kc and outputs the decrypted encryption key Kc to the encryption/decryption unit 43.

At the next step S25, the encryption/decryption unit 43 of the application encrypts a decrypted content received from the content processing unit 44 by using the encryption key Kc received from the key management unit 41 and outputs the encrypted content to the encryption/decryption unit 32 by way of the encrypted-content analysis unit 42 and the encrypted-information addition unit 33.

At the next step S26, the encryption/decryption unit 32 decrypts the encrypted content received from the encryption/decryption unit 43 of the application by using the encryption key Kc received from the key management unit 31 at the step S23 and outputs the decrypted content to the DTLA encryption/decryption unit 24.

At the next step S27, the DTLA encryption/decryption unit 24 encrypts the decrypted content received from the encryption/decryption unit 32 employed in the content protection unit 25 in accordance with the DTLA method and outputs the encrypted content to the input/output unit 22.

At the next step S28, the input/output unit 22 outputs the content which has been encrypted in accordance with the DTLA method and is received from the DTLA encryption/decryption unit 24 to the IEEE1394 bus 2.

It should be noted that, if the outcome of the judgment formed at the step S22 indicates that the authentication key Kn is invalid, the flow of the procedure goes on to a step S29. At the step S29, the key management unit 31 notifies the key management unit 41 of the application that the authentication of the authentication key Kn ends in no-go status.

In addition, in the output processing, the encryption key Kc can also be changed periodically as is the case with the input processing described earlier.

As described above, according to the embodiment, the content protection unit 25 of the IEEE1394 interface 11 exchanges contents only with an application having a valid authentication key Kn. However, an application capable of illegally copying a content is conceivably capable of acquiring a valid authentication key Kn by utilization of some techniques and, hence, illegally utilizing a content. In order to solve this problem, in this present invention, the key management unit 31 of the content protection unit 25 for forming a judgment on the validity of an authentication key Kn stores a revocation list of illegally used authentication keys Kn. In processing to authenticate an authentication key Kn, the key management unit 31 also compares the authentication key Kn with those put on the revocation list besides a judgment on mutual matching of an ID and a signature which are included in the authentication key Kn. An authentication key Kn matching one on the revocation list is not determined to be a valid key even if the ID and the signature included in the authentication key Kn matches each other.

It should be noted that there is conceived a technique whereby an authentication key Kn newly added to the revocation list is received by the key management unit 31 through a network such as the Internet or the IEEE1394 bus 2. According to a conceivable technique of utilizing the revocation list, authentication keys Kn are cataloged on the list individually. There is also conceived a technique of utilizing the revocation list whereby a plurality of authentication keys Kn are cataloged on the list simultaneously in a batch operation. In this case, the authentication keys Kn each have a predetermined value on the MSB (Most Significant Bit) side of the ID of the key Kn. By cataloging a plurality of authentication keys Kn in this way, it is possible to determine that all applications made by a specific software manufacturer are invalid. An example of such a software manufacturer is a software producer found to violate a contract which is made when an authentication key Kn is delivered.

In addition, the content protection unit 25 is also capable of detecting an event of outputting of a content to an application and, if the number of such events is reported to the owner of the content copyright or the system administrator through a means such as the Internet, the user can be requested to pay a fee for using the content or the encryption system and the state of utilization of the encryption system can be recognized.

It should be noted that the present invention can also be applied to isochronous and asynchronous packets of a content transmitted through an IEEE1394 bus as well as packets of a content transmitted through other media.

The computer program executed to carry out the pieces of processing described above can be presented to the user by means of a providing medium such as an information recording medium like a CD-ROM or through a providing medium in the form of a network such as the Internet or a digital satellite.

What is claimed is:

1. An information processing apparatus which is capable of editing a content with copyright information added thereto and is used for executing an application program having an authentication key and a secret key, said information processing apparatus comprising:

an encryption-key generation means for generating an encryption key by using a source key corresponding to said copyright information added to an input content and a random number;

an encryption means for encrypting the content by using said encryption key;

a judgment means for forming a judgment on validity of said application program by using said authentication key received from said application program;

a secret-key generation means for generating a secret key by using said authentication key received from said application program; and a supply means for supplying said encryption key encrypted by using said secret key generated by said secret-key generation means and said content encrypted by said encryption means to said application program in dependence on a result of said judgment formed by said judgment means.

2. An information processing apparatus according to claim 1 wherein said judgment means forms a judgment on validity of said authentication key by referring to a revocation list.

3. An information processing apparatus according to claim 1 wherein said encryption key is updated at predetermined intervals.

4. An information processing method adopted in an information processing apparatus which is capable of editing a content with copyright information added thereto and is used for executing an application program having an authentication key and a secret key, said information processing method comprising:

an encryption-key generation step of generating an encryption key by using a source key corresponding to said copyright information added to an input content and a random number;

an encryption step of encrypting the content by using said encryption key;

a judgment step of forming a judgment on validity of said application program by using said authentication key received from said application program;

a secret-key generation step of generating a secret key by using said authentication key received from said application program; and a supply step of supplying said encryption key encrypted by using said secret key generated at said secret-key generation step and said content encrypted at said encryption step to said application program in dependence on a result of said judgment formed at said judgment step.

5. An information processing method according to claim 4 whereby said encryption key is updated at predetermined intervals.

6. A providing medium for providing a program to be read out by a computer for driving an information processing apparatus, which is capable of editing a content with copyright information added thereto and is used for executing an application program having an authentication key and a secret key, to carry out processing including:

an encryption-key generation step of generating an encryption key by using a source key corresponding to said copyright information added to an input content and a random number;

an encryption step of encrypting the content by using said encryption key;

a judgment step of forming a judgment on validity of said application program by using said authentication key received from said application program;

a secret-key generation step of generating a secret key by using said authentication key received from said application program; and a supply step of supplying said encryption key encrypted by using said secret key generated at said secret-key generation step and said content encrypted at said encryption step to said application program in dependence on a result of said judgment formed at said judgment step.

7. A providing medium according to claim 6 wherein said encryption key is updated at predetermined intervals.

8. An information processing apparatus which is capable of editing a content with copyright information added thereto and is used for executing an application program having an authentication key and a secret key, said information processing apparatus comprising:
- an encryption-key generation mechanism configured to generate an encryption key by using a source key corresponding to said copyright information added to an input content and a random number;
- an encryption mechanism configured to encrypt the content by using said encryption key;
- a judgment mechanism configured to form a judgment on validity of said application program by using said authentication key received from said application program;
- a secret-key generation mechanism configured to generate a secret key by using said authentication key received from said application program; and
- a supply mechanism configured to supply said encryption key encrypted by using said secret key generated by said secret-key generation mechanism and said content encrypted by said encryption mechanism to said application program and dependence on a result of said judgment form by said judgment means.

9. An information processing apparatus according to claim 8, wherein said judgment mechanism forms a judgment on validity of said authentication key by referring to a revocation list.

10. An information processing apparatus according to claim 8, wherein said encryption key is updated at predetermined intervals.

11. An information processing apparatus which is capable of editing a content with copyright information added thereto and is used for executing an application program having an authentication key and a secret key, said information processing apparatus comprising:
- an encryption-key generation part configured to generate an encryption key by using a source key corresponding to said copyright information added to an input content;
- an encryption part configured to encrypt the content by using said encryption key;
- a judgment part configured to form a judgment on validity of said application program by using said authentication key received from said application program;
- a secret key generation part configured to generate a secret key by using information for computing said secret key received from said application program; and
- a supply part configured to supply said encryption key encrypted by said secret key generated by said secret-key generation part and said content encrypted by said encryption part to said application program in dependence on a result of said judgment formed by said judgment part.

* * * * *